US006973651B1

(12) United States Patent
Ching et al.

(10) Patent No.: US 6,973,651 B1
(45) Date of Patent: Dec. 6, 2005

(54) METHOD AND SYSTEM FOR MANAGING SUBSYSTEM PROCESSES IN A DMD SYSTEM

(75) Inventors: Jennie Ching, Northridge, CA (US); Eric Hsiao, San Marino, CA (US); Peter S. Lee, Calabasas, CA (US); Cris W. Sandoval, Santa Monica, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/538,380

(22) Filed: Mar. 29, 2000

(51) Int. Cl.[7] .......................... G06F 9/46; G06F 15/16
(52) U.S. Cl. ...................... 718/100; 718/102; 709/201
(58) Field of Search ............................ 709/100, 102, 709/104, 106–108, 200–203; 725/32–36; 718/100, 102, 104, 106–108

(56) References Cited

U.S. PATENT DOCUMENTS

| 4,724,491 A | | 2/1988 | Lambert |
| 5,055,924 A | | 10/1991 | Skutta |
| 5,424,770 A | | 6/1995 | Schmelzer et al. |
| 5,432,542 A | | 7/1995 | Thibadeau et al. |
| 5,450,122 A | | 9/1995 | Keene |
| 5,659,351 A | | 8/1997 | Huber |
| 5,758,345 A | * | 5/1998 | Wang .......................... 707/100 |
| 5,809,235 A | * | 9/1998 | Sharma et al. ............... 709/230 |
| 5,887,243 A | | 3/1999 | Harvey et al. |
| 5,907,494 A | * | 5/1999 | Dangelo et al. ................. 703/1 |
| 5,996,025 A | * | 11/1999 | Day et al. .................... 709/328 |
| 6,192,363 B1 | * | 2/2001 | Yasumura ..................... 707/10 |
| 6,222,530 B1 | * | 4/2001 | Sequeira ................... 715/500.1 |
| 6,405,317 B1 | * | 6/2002 | Flenley et al. ............... 713/200 |
| 6,434,680 B2 | * | 8/2002 | Belknap et al. ............. 711/161 |
| 6,535,878 B1 | * | 3/2003 | Guedalia et al. ............... 707/8 |
| 6,581,076 B1 | * | 6/2003 | Ching et al. ................. 707/204 |

FOREIGN PATENT DOCUMENTS

WO    WO9608923 A1    3/1996    ............ H04N 7/08

* cited by examiner

*Primary Examiner*—Meng-Al T. An
*Assistant Examiner*—Syed J Ali
(74) *Attorney, Agent, or Firm*—Sawyer Law Group LLP

(57) ABSTRACT

Aspects for managing subsystem processes from a central site in a digital media distributor system are presented. The aspects include utilizing a plurality of threads as a task manager in a central site server of the digital media distributor, and autonomously controlling initiation and termination of one or more subsystem processes with the task manager. The aspects further include providing the task manager as a main program thread of an operating system of a central site server of the DMD system, and managing subsystem processes from start-up to shut down, including states of online, offline, process inoperable, deadlock inoperable, and spawn inoperable, with the task manager to dynamically manage the DMD system.

19 Claims, 4 Drawing Sheets

Task Manager State Diagram For Managed Subsystems

METHOD AND SYSTEM FOR MANAGING SUBSYSTEM PROCESSES IN A DMD SYSTEM

RELATED APPLICATIONS

The present invention is related to co-pending U.S. application, entitled MULTIMEDIA INFORMATION COMPUTER SYSTEM AND METHOD OF OPERATION OF A PLAYLIST SCHEDULER, Ser. No. 09/420,802, filed on Oct. 19, 1999, and assigned to the assignee of the present invention.

FIELD OF THE INVENTION

The present invention relates to digital media distribution, and more particularly to managing subsystem processes from a central site in a digital media distributor (DMD) system.

BACKGROUND OF THE INVENTION

Although broadcasters have sophisticated systems for inserting national commercials into a program stream, including integrated traffic and billing systems, there are numerous obstacles to implementing a system to insert local commercials at small markets into a national program feed distributed by satellite. Until now, such local spot insertion advertising was the responsibility of the local broadcaster or cable operator.

Inserting local advertising poses several nontrivial technical, logistical and business challenges. First, literally hundreds of widely distributed local operators (or affiliates) would need to receive the commercials; ad agencies would have to ship analog tapes to hundreds of organizations, with different traffic and billing systems. These tapes would need to be tested for quality assurance, tracked, and stored until needed. They would then have to be distributed to video tape recorders and readied for computer controlled playout (analog) at the proper time, 24 hours a day, seven days a week. Such infrastructure generally exists at well-funded affiliates in major markets but is nonexistent and prohibitively expensive for smaller operators or affiliates in small markets.

Managing such tapes with ads for local commercials and inserting them properly into the program feed is a complex undertaking not well-suited for the smaller operators, especially for channels with smaller audiences in smaller markets. A quality broadcast involves more than excellent program material; it must provide seamless insertion of national and local advertisements, promotions, and station identifications.

Equally important is the ability to maintain the integrity of the national television programming. Centralized control of the channel's programming (playout) is required to prevent local affiliates from tampering with the programming.

A need exists for a digital media distributor system with centralized and autonomous management of subsystem processes associated with data object transmissions. The present invention addresses such a need.

SUMMARY OF THE INVENTION

Aspects for managing subsystem processes from a central site in a digital media distributor system are presented. The aspects include utilizing a plurality of threads as a task manager in a central site server of the digital media distributor, and autonomously controlling initiation and termination of one or more subsystem processes with the task manager. The aspects further include providing the task manager as a main program thread of an operating system of a central site server of the DMD system, and managing subsystem processes from start-up to shut down, including states of online, offline, process inoperable, deadlock inoperable, and spawn inoperable, with the task manager to dynamically manage the DMD system.

Through the present invention, a task manager provides an ability to manage subsystem processes associated with data object transmissions of the DMD in a straightforward and effective manner. A thread architecture of the task manager achieves efficiency through worker thread command objects for each subsystem process that allows autonomous control of the subsystem process(es) that are operating. Thus, the task manager successfully monitors global system performance needs. These and other advantages of the present invention will be more fully understood in conjunction with the following detailed description and accompanying drawings.

DETAILED DESCRIPTION

The present invention relates to managing subsystem processes in a digital media distributor system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In accordance with the present invention, a digital media distributor (DMD) provides a complete end-to-end system that gives local cable or network affiliates the ability to provide local ads and announcement insertion together with the delivery of cable or network feed(s). In general, the DMD integrates the entire process of sales, traffic, digital encoding and storage of spots, transmission of data, local insertion of digital ads and announcements, account reconciliation, and billing. Spots (i.e., media such as commercials, station identification, public service announcements, etc.) are digitized by the cable or network operator, and then digitally transmitted to the local cable head-ends or network affiliates from a central site. These digital spots are then stored on the remote site servers located at each head-end or affiliate.

Figure 1:
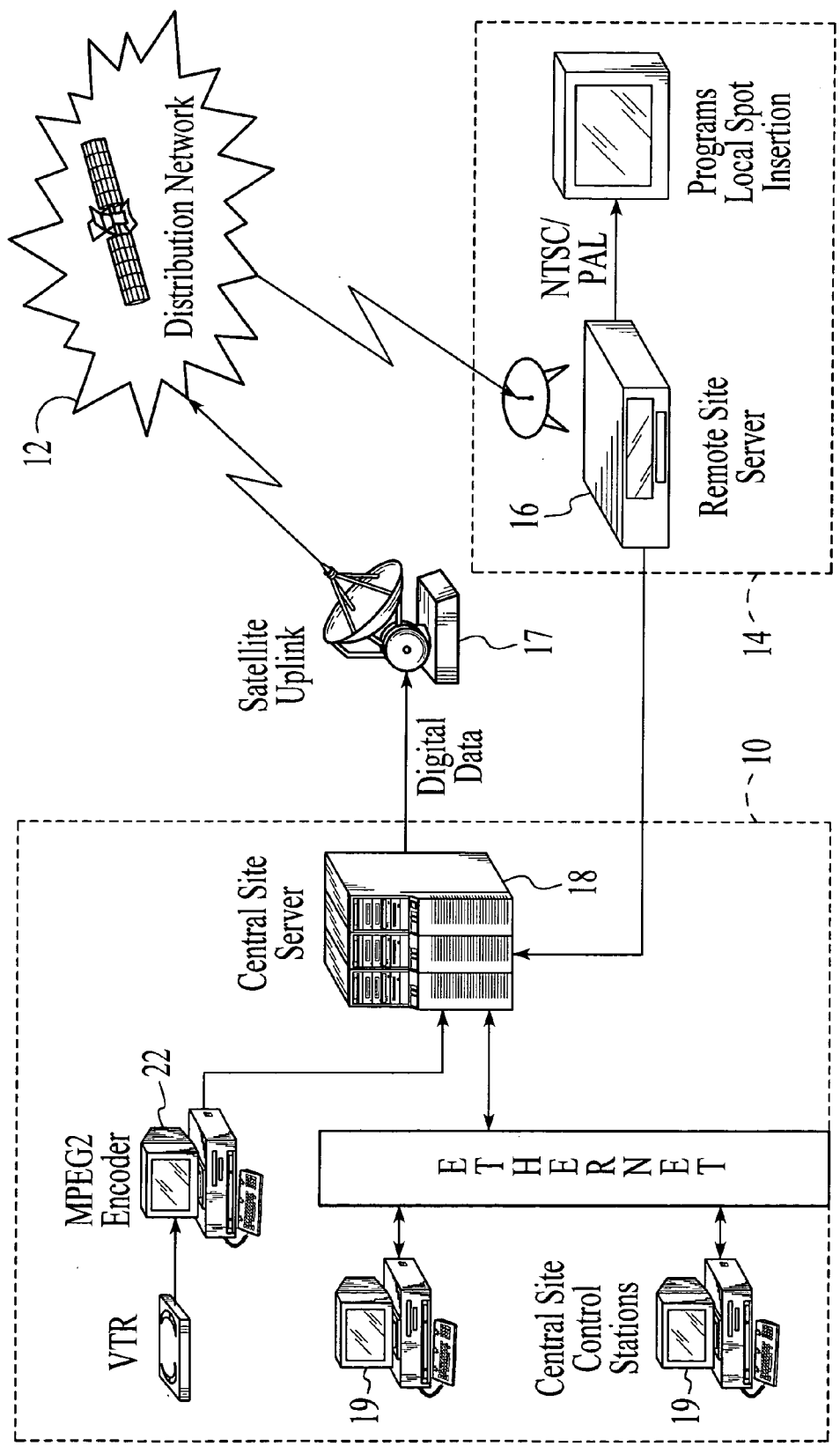
FIG. 1 illustrates a block diagram of a digital media distribution system in accordance with the present invention.

A block diagram of a DMD in accordance with the present invention is illustrated in FIG. 1. As shown, the DMD includes three major components: a central site 10, a distribution network 12, and a remote site 14. The central site 10 is the location for the digital encoding of MPEG-2 files from source video tapes, storage and management of digital files, management of remote site(s) 14, and distribution of schedules and MPEG-2 files. Thus, the processing, analysis, distribution, and management of data occurs at the central site 10. The distribution network 12 is the mechanism by which the remote site(s) 14 receive program streams and digital spots. The data distribution is accomplished via various methods, such as a satellite and/or land-based distribution. The broadcaster may choose to have the program stream sent via terrestrial links (e.g., token ring, ethernet, etc.), while the spot insertion is sent via satellites or vice versa.

The remote site(s) 14 house the remote site server(s) 16. By way of example, a suitable remote site server 16 includes a Pentium processor-based device with a hard disk for local storage and a video switch card (to switch between program and commercial insertion) running software including Windows NT, DMD programming, Lotus Notes client, Program Loader, and Symantec pcANYWHERE. These unattended, computerized systems receive the local spot insertion and provide As-Run file generation. The remote site server 16 is a video server that receives and stores digitized spots utilized for local insertion at the cable head-end. The remote site server 16 receives digitally encoded ads via satellite or other distribution network. These spots are decoded to an analog signal and inserted into the cable or network operator feed at scheduled times, i.e., into scheduled local availability times. The remote site server 16 can be customized in various configurations based on the number of output channels required, the type of output format (e.g., NTSC, PAL), the amount of local storage required (i.e., the number of spots on disk), the type of network (satellite or terrestrial), the type of trigger for spot insertion (e.g., time of day, VITC, cue-tome, VBI trigger), the audio format and connections (stereo, mini-XLR or XLR), the redundancy requirements (RAID, mirrored disks), and the preview channel.

By way of example, the following provides a sample process that illustrates an example of one process which the DMD solution can support. A region, e.g., any grouping of one or many cable head-ends for cities, states, provinces, or countries, defined by cable or network operators in an area, sells a commercial in the local availability time. All remote site servers 16 within the same region play the same material at the same time, including all network programs, national spots, local commercials, announcements, etc. The videotaped segment for the commercial is digitally encoded. The digital material is scheduled for delivery to each remote site server 16 prior to broadcast. The playlist, digitized spots, and the broadcast program stream are sent, via satellite, to all of the remote site servers 16 within the region. All of the remote site servers 16 within the region air the local spots for that region at the scheduled time. As-Run logs are retrieved by the central site 10 from the remote site servers 16. As-Run logs are sent to the local markets, reviewed, reconciled, and customers are billed. Commercials and As-Run logs are archived.

A main component in the central site 10 is the central site server 18. By way of example, a suitable central site server 18 includes an IBM RS/6000 F50 dual CPU system, or a Pentium II compatible PC, running the IBM UNIX operating system, AIX, DB2 server software, Lotus Notes server software, ADSM, Windows NT (for PC-based central site server), and the DMD programming. Suitable components for the control workstations 19 include Pentium compatible PCs running Windows NT, Lotus Notes client, DB2 client, Microsoft Internet Explorer, and DMD programming.

Figure 2:
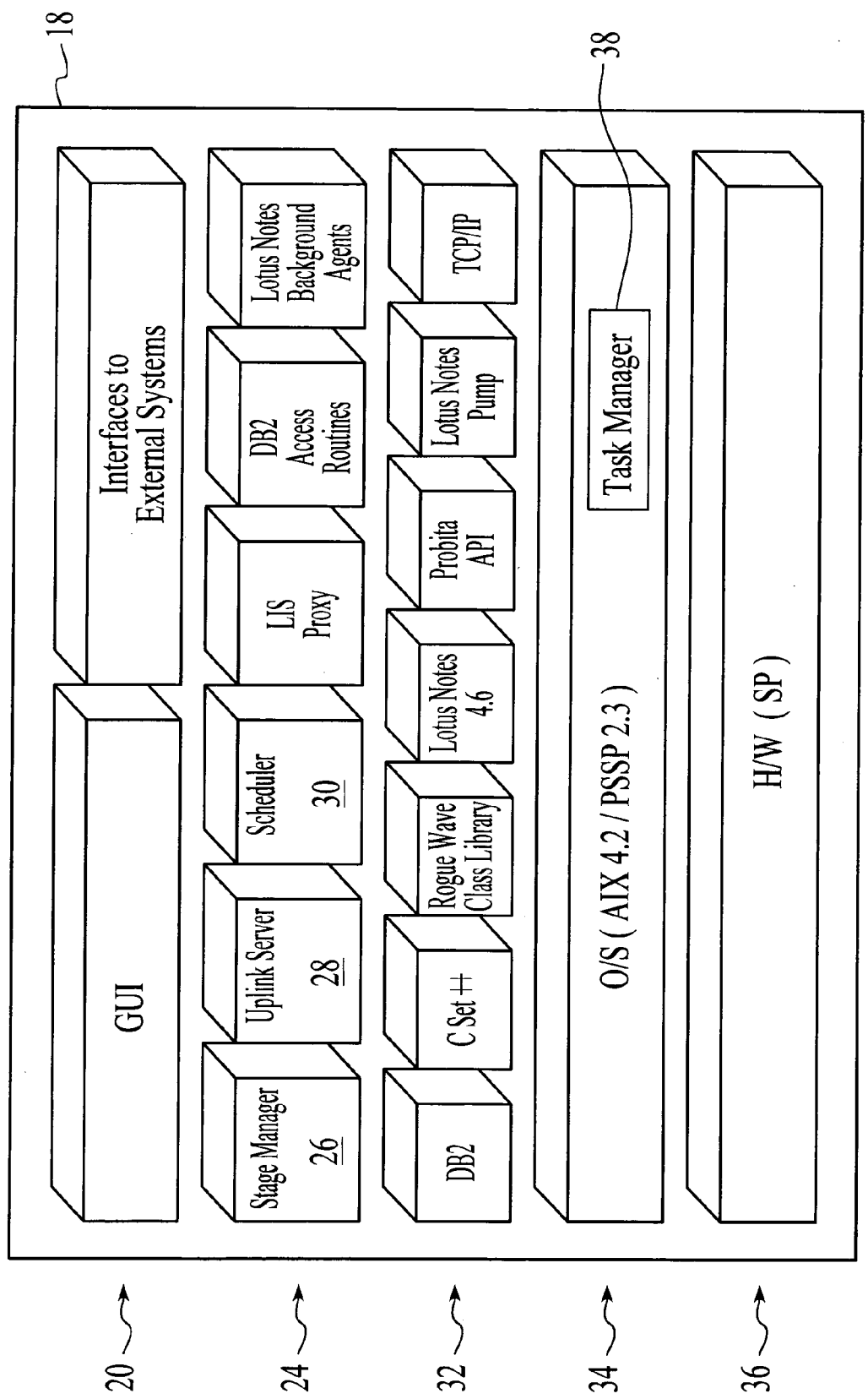
FIG. 2 illustrates an example of a suitable layered architecture for the central site server.

The central site server 18 includes software on a suitable computer readable medium that is architected using a layered model, in which each layer isolates the upper layers from the details of the lower layers and individual components within a layer provide a unique set of services, as is well appreciated by those skilled in the art. FIG. 2 illustrates an example of a suitable layered architecture for the central site server 18. The top layer 20 addresses the external interfaces of the central site server 18, including a graphical user interface (GUI) component and the interfaces to the external systems. The GUI component, e.g., using Lotus Notes, provides administrators and operators with the ability to monitor and control the DMD. In accordance with the present invention, the interfaces to external systems include interfaces to traffic systems, interfaces to stations in a box (SIBs) which send Lotus Notes messages, and interfaces to encoder systems (22, FIG. 1), which store encoded spot files in a disk pool server for retrieval by the central site server 18.

Underneath the top layer is a layer 24 of specialized components including a stage manager component 26, an uplink server component 28, and a transmission scheduler component 30. This layer 24 may also include specialized components for creating commands and interpreting responses from SIBs, managing access to all the database queues and other data stores, and providing automated agents that run based on time or events to manage the external interfaces, e.g., processing files received from traffic systems. The stage manager 26 manages any tape related activity, the uplink server 28 manages transmissions through the uplink network (12, FIG. 1), and the transmission scheduler manages scheduling tasks. Also included as a next layer is a programming layer 32. The layer 32 includes the programming libraries and APIs (application programming interfaces) that are used to build the specialized components. The lower two layers include an operating system layer 34 and a hardware layer 36 for the fundamental operation of the central site server 18, as is well appreciated by those skilled in the art.

Figure 3:
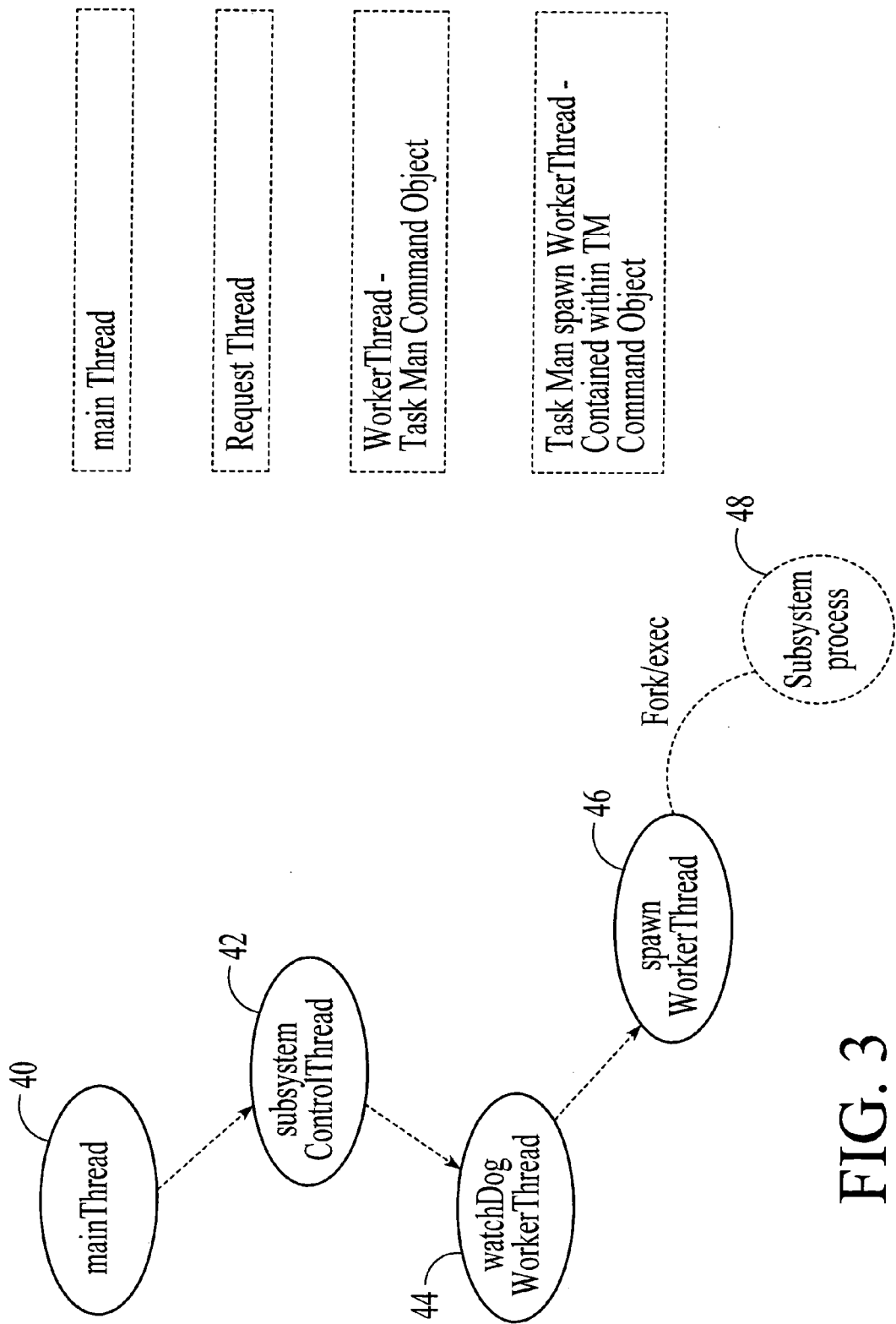
FIG. 3 illustrates a thread architecture for a task manager of the central site server in accordance with the present invention.

In accordance with the present invention, the operating system layer 34 of the central site server 18 includes a task manager 38 that dynamically starts and stops subprocesses for managing several of the processes of the central site server 18. These processes include the scheduler, the stage manager, an LIS (local insertion system) proxy, an error document check, a response document processor, a disk pool manager, a request generator, an all As-Run manager, an individual As-Run manager, an update network break time process, and a network local broadcast (NLSB) process. Using a standard thread model architecture, the task manager 38 includes a mainThread 40, one subsystem ControlThread 42, and worker threads, with a watchdog WorkerThread 44 and a spawn WorkerThread 46 per subsystem process 48, as shown in the diagram of FIG. 3. The mainThread 40 is suitably provided as a traditional 'C' language (or other suitable language) main program thread with the operating system 34 as its parent. The subsystem ControlThread 42 has the mainThread 40 as its parent and determines which and if a subsystem process needs to be started. The watchdog WorkerThread 44 has the subsystem ControlThread 42 as its parent and performs mainly two functions: it starts subsystem process(es) through the spawn WorkerThread 46; and it monitors the performance of the subsystem process(es). The spawn WorkerThread 46 has the watchdog WorkerThread as its parent and performs the actual spawn of the subsystem and waits for its termination.

The subsystem ControlThread 42 preferably monitors global system performance needs by inspecting fields in a database provided for the subsystems according to a predefined polling interval (e.g., a poll interval of about 10 seconds) and logging its inspection time in a process logging table. If the subsystem ControlThread determines that an instance of a subsystem needs to be started, and the subsystem is marked as operable, the subsystem ControlThread 42 starts a watchdog WorkerThread 44.

The watchdog WorkerThread 44 then starts a subsystem process through the spawn WorkerThread 46 and monitors the performance of the subsystem process. In starting the process through the spawn WorkerThread 46, the watchdog WorkerThread 44 logs the spawning in a process logging table and process status table and waits for the termination of the spawn WorkerThread 46. The spawn WorkerThread 46 spawns the subsystem process and waits for termination. Termination occurs by the subsystem process itself and may be set to occur when a predetermined period of inactivity for the subsystem process is reached (e.g. about 3 seconds). Any termination causes the spawn WorkerThread 46 to save the return value for the termination, signal the watchdog WorkerThread 44 that it is terminating, and exit itself.

If the subsystem process terminates normally, the watchdog WorkerThread 44 logs the normal termination in the process logging table and process status table, and exits itself. However, if the subsystem process terminates abnormally, the watchdog WorkerThread 44 logs the abnormal termination in the process logging table and process status table and inspects previous entries in the process logging table to determine if the subsystem process has terminated abnormally a given number of times (e.g., 2) within a given number of poll intervals. If so, an e-mail is sent by the watchdog WorkerThread 44 to a system administrator. If not, the watchdog WorkerThread 44 attempts to remove the queue entry that the subsystem was processing at the time the subsystem process terminated. If the entry cannot be removed, the watchdog WorkerThread 44 logs the inability to complete the remove operation in the process logging table, sends an e-mail to the system administrator, and sets a state variable in the appropriate database to indicate that the subsystem process is inoperable. If the entry can be removed, the watchdog WorkerThread 44 logs the operation in the process logging table, and respawns the subsystem process, logging it in the process logging table and process status table.

In monitoring the performance of the subsystem process, the watchdog WorkerThread 44 does as its name implies, it acts as a watchdog for the subsystem process performance based on system throughput requirements. If the subsystem process does not appear to be meeting the throughput requirements, the watchdog WorkerThread 44 considers the subsystem process deadlocked. The watchdog WorkerThread 44 then sets a local program state variable for the spawn WorkerThread 46 that indicates that it will terminate the subsystem process. The watchdog WorkerThread 44 then issues a kill signal to the subsystem process. Upon receipt of the subsystem process termination, the watchdog WorkerThread 44 logs the subsystem process deadlock in the process logging and process status tables. Previous entries in the process logging table or local program variable are then inspected to determine if the subsystem process has deadlocked a given number of times within a given polling interval.

If the subsystem process has deadlocked the given number of times within the given polling interval, the watchdogWorkerThread clears the local program variable, sends an e-mail to the system administrator, and sets a state variable in the appropriate database indicating that the subsystem process is inoperable. If the subsystem process has not deadlocked the given number of times within the given interval, the watchdog WorkerThread 44 clears the local program variable and respawns the subsystem process, logging it in the process logging and process status tables.

Figure 4:
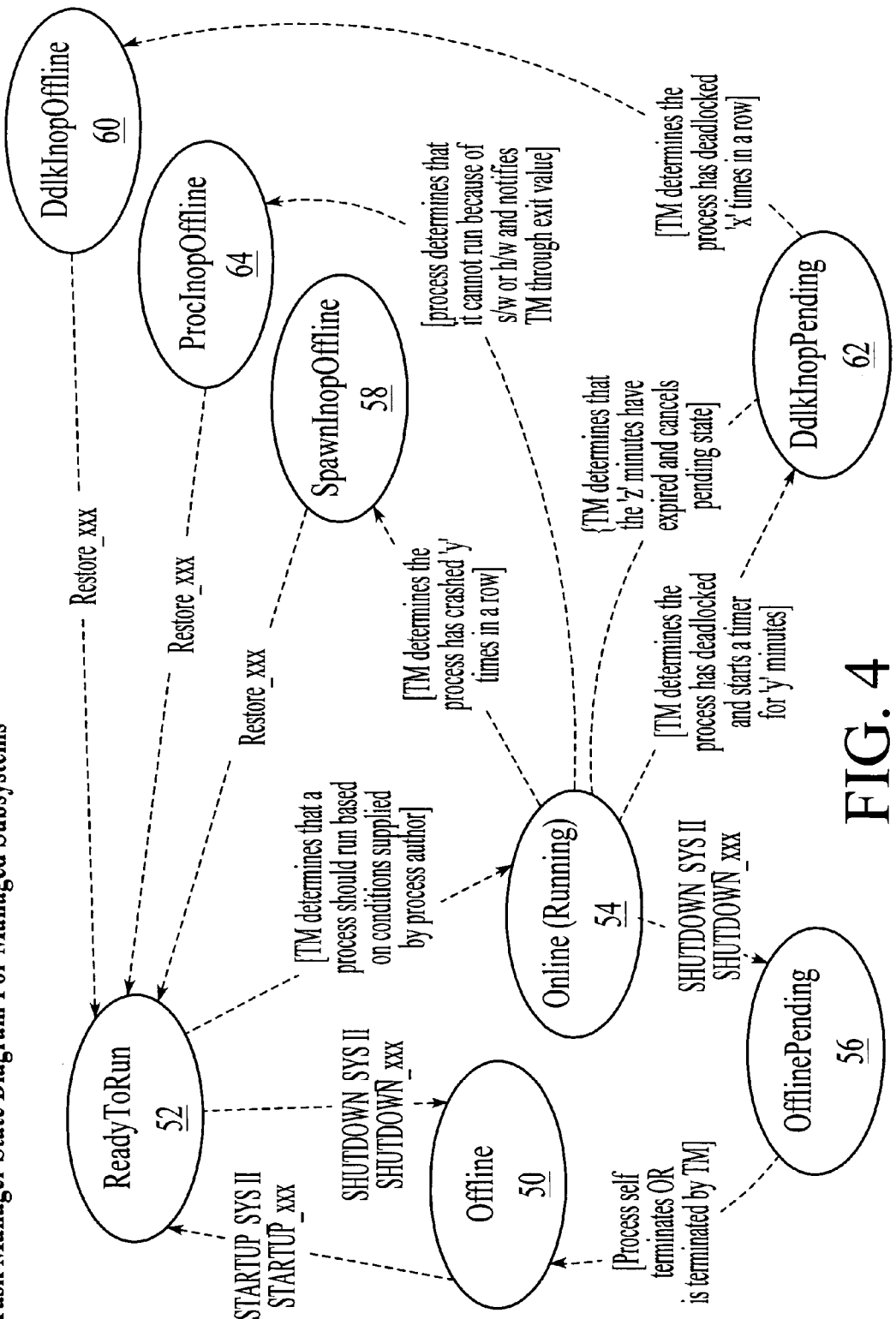
FIG. 4 illustrates a task manager state diagram in accordance with the present invention.

FIG. 4 illustrates a task manager state diagram for managed subsystems. The text shown in brackets ([ ]) in FIG. 4 refers to internal processing performed by the task manager 38 that causes a state change, e.g., examining a request queue and determining something for the process to do or expiration of a predefined time period. Verbs that a command interface (e.g., a GUI) pushes onto the request queue appear in upper case text without the brackets. The text shown with the "xxx" extension refers to a subsystem process for correspondence with the associated verb in the uppercase text. The following tables more particularly describe the state transitions for both normal and abnormal transitions.

Normal Transitions:

| State | Description |
|---|---|
| Offline 50 | In normal conditions, the process is in the Offline state 50 until a STARTUP_xxx or STARTUP_SYS is received by the task manager 38 |
| ReadyToRun 52 | When the task manager 38 receives the STARTUP, it moves the process(es) to the ReadyToRun state 52; however the task manager 38 does not actually start running the process until the specified condition has been met, i.e., the presence of something on the request queue or expiration of a predefined time interval. If the task manager 38 receives a SHUTDOWN_xxx or SHUTDOWN_SYS for a process while in this state, the task manager 38 sets the process state to Offline 50. |
| Online (Running) 54 | Once one of the above conditions has been met, the task manager 38 spawns the process and sets the state to Online (Running) 54 |
| Offline Pending 56 | If the task manager 38 receives a SHUTDOWN_xxx or SHUTDOWN_SYS signal, the task manager 38 pushes a request for the process to shutdown onto the request queue, then moves the process to Offline Pending state 56. If the process does not honor the request within a predefined interval, the task manager 38 moves the process to the Offline state 50 or terminates the process and then moves it to the Offline state 50. |

Abnormal Transitions:

A) Subsystem Crashes while Executing

| State | Description |
|---|---|
| Online (Running) 54 | If the process crashes more than a given number of times (e.g., 2) within a given time interval (e.g., 45 minutes), the task manager 38 stops trying to respawn the process and moves the process to an offline state, SpawnInopOffline 58. |
| SpawnInopOffline 58 | Once in this state 58, operator intervention is needed to recover, and neither a STARTUP_xxx or STARTUP_SYS signal will move the process to the Online (Running) state 54. Once the operator fixes the problem, a RESTORE_xxx command is needed to place the process in the ReadyToRun state 52. |
| ReadyToRun 52 | The task manager 38 does not start running the process until a specified condition has been met, i.e., the presence of something on the request queue or the expiration of some predefined time interval. |

B) Subsystem Deadlocks within Some Time Period

| State | Description |
|---|---|
| Online (Running) 54 | If the process deadlocks more than a given number of times (e.g., 2) within a given interval (e.g., 45 minutes), the task manager 38 stops trying to respawn the process and moves the process to an offline state, DdlkInopOffline 60 |
| DdlkInopPending 62☐ | The task manager 38 places the process in this state 62 once the process has deadlocked and keeps the process there for a given amount of time, e.g., 2 hours, to see if the process will deadlock again. If the process does deadlock again, the task manager 38 moves the process to the DdlkInopOffline state 60. If the process does not deadlock again, the task manager 38 will move the process back to the Online (Running) state 54. ± ☐☐☐ |
| DdlkInopOffline 60 | Once in this state 60, operator intervention is required to recover, and neither a STARTUP_xxx or STARTUP_SYS signal will move the process to the Online (Running) state 54. Once the operator fixes the problem, a RESTORE_xxx command is needed to place the process in the ReadyToRun state 52. |
| ReadyToRun 52 | The task manager 38 does not start running the process until a specified condition has been met, i.e., the presence of something on the request queue or the expiration of some predefined time interval. |

C) Subsystem Unable to Start Due to External Hardware or Software

| State | Description |
|---|---|
| Online (Running) 54 | If the process can't start because some software or hardware is not running as reported to the task manager 38 by an exit status of the process(es), the task manager 38 stops trying to respawn the process and moves the process to an offline state, ProcInopOffline 64. |
| ProcInopOffline 64 | Once in this state 64, operator intervention is needed to recover, and neither a STARTUP_xxx or STARTUP_SYS signal will move the process to the Online (Running) state 54. Once the operator fixes the problem, a RESTORE_xxx command is needed to place the process in the ReadyToRun state 52. |
| ReadyToRun 52 | The task manager 38 does not start running the process until a specified condition has been met, i.e., the presence of something on the request queue or the expiration of some predefined time interval. |

The task manager in accordance with the present invention provides an ability to manage subsystem processes associated with data object transmissions of the DMD in a straightforward and effective manner. The thread architecture of the task manager achieves efficiency through worker thread command objects for each subsystem process that allows autonomous control of the subsystem process(es) that are operating. Thus, the task manager successfully monitors global system performance needs.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing subsystem processes from a central site in a digital media distributor (DMD) system, the method comprising:
    utilizing a plurality of threads, including utilizing a main manager thread, as a task manager and a main program thread of an operating system in a central site server of the (DMD) system; and
    autonomously controlling initiation and termination of one or more subsystem processes associated with data object transmissions of the DMD system with the task manager, wherein autonomously controlling further comprises managing subsystem processes associated with data object transmissions of the DMD system from start-up to shut down, including states of online, offline, process inoperable, deadlock inoperable, and spawn inoperable, to dynamically manage the DMD system.

2. The method of claim 1 wherein utilizing a plurality of threads further comprises utilizing a subsystem control thread as a child thread of the main manager thread.

3. The method of claim 2 wherein utilizing a plurality of threads further comprises utilizing a watchdog worker thread as a child thread of the subsystem control thread.

4. The method of claim 3 wherein utilizing a plurality of threads further comprises utilizing a spawn worker thread as a child thread of the watchdog worker thread.

5. The method of claim 4 further comprising utilizing one watchdog worker thread and one spawn worker thread for each subsystem process.

6. The method of claim 5 further comprising utilizing the watchdog worker thread to start each subsystem process through the spawn worker thread and to monitor performance of each subsystem process.

7. The method of claim 6 wherein utilizing the spawn worker thread further comprises spawning each subsystem process and waiting for termination of each spawned subsystem process.

8. The method of claim 2 further comprising utilizing the subsystem control thread to determine need for initiation of a subsystem process.

9. A method for managing subsystem processes from a central site in a digital media distributor system, the method comprising:
    utilizing a plurality of threads, including utilizing a main manager thread, as a task manager in a central site server of the digital media distributor system; and
    autonomously controlling initiation and termination of one or more subsystem processes associated with data object transmissions of the digital media distributor system with the task manager, including controlling a subsystem process from the group comprising a scheduler process, a stage manager process, a local insertion system proxy process, an error document check process, a response document processor process, a disk pool manager process, a request generator process, As-Run manager processes, an update network break time process, and a network local broadcast process.

10. A digital media distributor (DMD) system with centralized management of subsystem processes, the DMD system comprising:
    a distribution network for data object transmission;
    a central site server, the central site server utilizing a main manager thread for a task manager as a main program thread of an operating system for autonomous control of initiation and termination of one or more subsystem processes associated with data object transmission of the DMD system, wherein the one or more subsystem processes associated with data object transmission of the DMD system further comprise subsystem processes from start-up to shut down, including states of online, offline, process inoperable, deadlock inoperable, and spawn inoperable; and a plurality of remote site servers for receiving data object transmissions from the central site server via the distribution network.

11. The system of claim 10 wherein the central site server utilizes a subsystem control thread as a child thread of the main manager thread.

12. The system of claim 11 wherein the central site server utilizes a watchdog worker thread as a child thread of the subsystem control thread.

13. The system of claim 12 wherein the central site server utilizes a spawn worker thread as a child thread of the watchdog worker thread.

14. The system of claim 13 wherein the central site server utilizes one watchdog worker thread and one spawn worker thread for each subsystem process.

15. The system of claim 14 wherein the central site server further utilizes the watchdog worker thread to start each subsystem process through the spawn worker thread and to monitor performance of each subsystem process.

16. The system of claim 15 wherein the central site server further utilizes the spawn worker thread for spawning each subsystem process and waiting for termination of each spawned subsystem process.

17. The system of claim 11 wherein the central site server further utilizes the subsystem control thread to determine need for initiation of a subsystem process.

18. A computer readable medium containing program instructions for managing subsystem processes from a central site in a digital media distributor (DMD) system, the program instructions comprising:

providing a task manager as a main program thread of an operating system of a central site server of the DMD system; and managing subsystem processes associated with data object transmissions of the DMD system from start-up to shut down, including states of online, offline, process inoperable, deadlock inoperable, and spawn inoperable, with the task manager to dynamically manage the DMD system.

19. The program instructions of claim 18 wherein providing a task manager further comprises utilizing a control thread and worker threads for managing the subsystem processes.

* * * * *